[19] United States Patent
Strunk

[11] Patent Number: 5,915,944
[45] Date of Patent: Jun. 29, 1999

[54] FISHING LURE

[76] Inventor: Richard L. Strunk, 11 Albion Rd., Billerica, Mass. 01821

[21] Appl. No.: 08/903,535

[22] Filed: Jul. 30, 1997

[51] Int. Cl.$^6$ .................................................... A01K 85/00
[52] U.S. Cl. .............................. 43/42; 43/42.04; 43/42.1; 43/42.26; 43/42.35; 43/42.38; 43/42.41; 43/42.72
[58] Field of Search ................................ 43/42.04, 42.06, 43/42.1, 42.26, 42.41, 42.42, 42.72, 42.02, 42.22, 42.35, 42, 42.38

[56] References Cited

U.S. PATENT DOCUMENTS

| | | | |
|---|---|---|---|
| 1,976,695 | 10/1934 | Boehm | 43/42 |
| 2,218,280 | 10/1940 | Deering | |
| 2,616,203 | 11/1952 | Sarakas | 43/17.2 |
| 2,746,200 | 5/1956 | Dale | |
| 2,770,063 | 11/1956 | Martin | |
| 2,979,849 | 4/1961 | Anderson, Jr. | 43/42.02 |
| 3,057,108 | 10/1962 | Jacobsen | |
| 3,438,144 | 4/1969 | Lincoln | |
| 3,685,192 | 8/1972 | Stibbard | 43/42.04 |
| 3,735,518 | 5/1973 | Kleine et al. | |
| 4,516,352 | 5/1985 | Firmin | |
| 4,745,699 | 5/1988 | Gage | |
| 4,771,567 | 9/1988 | Cannon | |
| 4,823,503 | 4/1989 | Tesch | |
| 4,862,630 | 9/1989 | Welch | 43/42.26 |
| 4,912,871 | 4/1990 | Brady | |
| 5,299,378 | 4/1994 | Ballard | 43/42.06 |
| 5,333,406 | 8/1994 | Wylie | |

Primary Examiner—Jack W. Lavinder
Attorney, Agent, or Firm—O'Connell Law Firm

[57] ABSTRACT

A simulative fishing lure for attracting and catching fish who prey on lobsters. The fishing lure is comprised of a fishing jig removably retained by a body cavity within a resiliently deformable simulative lobster body. A preferred fishing jig is comprised of a structure formed from a single member of generally rigid but ductile material. A mechanism for attaching a fishing line is fixed to an anterior portion of the jig, a mechanism for attaching a ballast is attached to a middle portion of the jig, and a mechanism for attaching a fish hook is attached to a posterior portion of the jig. A shock absorber is interposed between the fishing line attaching mechanism and the fish hook attaching mechanism. A hook shank retainer comprised of a volume of resiliently compressible material with a slit therein is attached to a posterior portion of the fishing lure. The simulative body portion has a multiplicity of vent holes for permitting air to escape from the body cavity. A flap is included in an underside of the fishing lure body for providing greater access to the body cavity, and a bait scent pad may be contained within the body cavity.

14 Claims, 3 Drawing Sheets

FISHING LURE

FIELD OF THE INVENTION

The present invention relates to the art of fishing. More particularly, it relates to a lure for attracting and catching fish.

BACKGROUND OF THE INVENTION

Most who have hunted lobster are aware that the benthic creatures can move exceedingly quickly from an open, vulnerable spot on the sea floor. With a quick flexure of its tail, a lobster can propel itself a significant distance to safe cover. Once backed in under a rock, the lobster is nearly invulnerable, particularly to a hunting fish. As a result, surprise is nearly an absolute requirement for any hunter hoping to catch a lobster in open water, and it is the only means by which most fish can hope to seize upon a healthy lobster in any circumstance. Therefore, the most desirable lobster to a hunting fish is one that is sitting still and unaware in an open area of the sea floor. When such a rare thing is seen, fish attack such lobsters with deadly speed and ferocity. To the dismay of lobsters and lobstermen, ravenous hunting fish commonly eat small lobsters whole while goring and dismembering lobsters too large to swallow.

Although the ravenous hunting fish may be the enemy of lobstermen and lobsters alike, its feeding practices present a tremendous and unique opportunity for anglers, the hunters of these hunters. Stated most simply, the present disclosure relays the inventor's discovery that there is a tremendous need for and significant benefits to be achieved by a lure that can be lowered by a line onto the ocean floor to lie generally still to simulate the appearance and slight movements of an unaware and vulnerable lobster.

With this need now apparent, the inventor was prompted to discover a number of derivative needs. These have given rise to a number of further improvements found in the present fishing lure. For example, upon realizing that a lure simulating a generally still lobster sitting unaware in open water would induce predatory fish into a violent attack, the inventor appreciated that the lure might be irreparably damaged by the striking of a fish. It thus came to light that an ideal lure would permit a damaged simulative body portion to be removed and replaced relative to a skeletal framework or jig so that a fisherman would not be forced to purchase a complete new lure each time a simulative body portion was damaged. Furthermore, a preferred lure would detachably retain a barb portion of a hook at a selected orientation to increase the likelihood that an attacking fish would be hooked, reduce the likelihood of the lure's snagging, and reduce damage to the simulative body portion of the lure by the barb portion of the hook's tending to detach from the simulative body portion of the lure upon attack. The inventor also realized that the fishing location and the fishing conditions of a given day would affect what sizes and styles of a lure's simulative body portion are most effective. With this, a need became clear for a simulative lure that would permit an interchangeability of simulative body portions of different sizes and styles. Ideally, such a lure would further permit a user to suit the hardware of the lure (i.e., line, ballast, and hook size and type) to particular sea conditions and prey. Furthermore, the lure would be particularly suited and designed for dropping upright onto the sea floor and sitting generally still with only its extremities moving about with sea movement.

SUMMARY OF THE INVENTION

Advantageously, a principal object of the present invention is to provide a fishing lure that simulates the appearance of a generally still lobster resting unaware on the ocean floor.

A further object of the invention is to provide a fishing lure which permits removal and replacement of a simulative body portion relative to a fishing jig.

Yet another object of the invention is to provide a fishing lure that permits a user to suit the hardware of the lure to particular sea conditions and prey.

Still another object of the invention is to provide a fishing lure that may be lowered to the sea floor by a fishing line and that tends to assume an upright orientation thereon and to sit generally still with only its extremities moving about with sea movement.

An additional object of the invention is to provide a fishing lure that detachably retains a barb portion of a hook at a selected orientation.

Another object of the invention is to provide a fishing lure that absorbs a striking shock of an attacking fish to increase the likelihood that an attacking fish will be hooked and to decrease damage to the lure further.

A still further object of the invention is to provide a fishing lure that is economical in materials and simple in construction such that a high-quality device can be manufactured and sold at a reasonable price.

These and other objects and advantages of the present invention will become apparent in light of the present disclosure.

In accomplishing the aforementioned objects, one embodiment of the present invention basically comprises a simulative fishing lure for attracting and catching fish who prey on lobsters. The lure has a simulative lobster body portion of the fishing lure defined by an anterior cephalothorax portion and a posterior abdomen portion. A multiplicity of simulative lobster legs are attached to and extend from opposite sides of the body portion. The lure further includes a means for coupling the simulative lobster body to a fishing jig. Where suitable, the lure may simulate an American lobster with large claws or chela, a multiplicity of pairs of thinner locomotion legs, and a pair of antennae. In other geographies, it may be ideal for the lure to simulate a spiny lobster body, which does not have chela, with a multiplicity of pairs of locomotion legs, a pair of antennae, and a multiplicity of sharp spines projecting from the cephalothorax portion.

A fishing jig may be coupled to the simulative lobster body, preferably generally along a centerline of the lure. The jig may have a fishing line attaching means fixed to an anterior portion of the jig, a ballast attaching means fixed to a middle portion of the jig, and a hook attaching means fixed to a posterior portion of the jig. The inventor has theorized and proven that under such an arrangement the fishing lure tends to assume an upright orientation after being lowered to the sea floor because the ballast is located generally at a lateral and longitudinal center of the fishing jig. As a result, the lure consistently simulates an unaware lobster sitting upright and generally still on the sea floor with only its extremities moving about.

In light of the severity with which fish are known to attack lobsters, a shock absorber such as a resiliently compressible mechanism interposed on the jig between the fishing line attaching means and the hook attaching means would be likely to reduce damage to the lure and would be likely to increase the likelihood of the hook effectively hooking an attacking fish instead of the hook disadvantageously tearing through the mouth of the fish.

Also, adaptability of the invention to suit various sizes and types of prey may be enhanced further by constructing the hook attaching means as a longitudinally elongated loop and further including a hook shank retainer coupled to the fishing lure posteriorly to the hook attaching means for retaining a shank of a hook substantially adjacent to the simulative lobster body. Such an arrangement has been found to allow hooks of a multiplicity of different sizes to be attached to the fishing lure. The inventions effectiveness may be improved still further where the hook shank retainer is comprised of a volume of resiliently compressible material with a slit therein aligned with a centerline of the simulative lobster body. With this, a shank of a fishing hook may be sandwiched within the slit and held substantially adjacent to the simulative lobster body and the barb of the hook may be oriented and retained in a selected orientation. This reduces the chances of snagging and allows a striking fish to pull the shank of the hook from the hook retainer to minimize damage to the simulative lobster body and to increase the likelihood that an attacking fish will be hooked.

To enhance its simplicity and economy of construction and to increase its durability, the fishing jig may be formed from a single member of generally rigid but ductile material. For example, a first end of the single member may be rolled back upon itself to comprise the fishing line attaching means in the form of an eyelet, a second end of the single member may be folded back upon itself to comprise the fishing hook attaching means in the form of a rectangular loop, and a middle portion of the single member may be doubled over upon itself to comprise a ballast attaching means in the form of a triangular loop with an anteriorly-extending first section of the single member and a posteriorly-extending second section of the single member comprising an overlapping portion of the ballast attaching means. In such an embodiment, the shock absorber may be a resiliently-compressible mechanism such as a spring or a rubber sleeve surrounding the overlapping portion of the first section and the second section of the single member to bias opposing legs of the triangular loop apart.

Of course, a major object of the invention is achieved by providing a fishing lure wherein body portions and fishing jigs may be interchanged to replace damaged body portions and to suit particular environmental conditions or a desired prey. For example, the fishing lure body may be formed of a resiliently deformable material and there may be a body cavity within the fishing lure body for removably retaining the fishing jig, and there may be one or more access openings in the fishing lure body for permitting access to the fishing line attaching means, the ballast attaching means, and the hook attaching means. With this, a fishing jig may be manipulated into and out of the body cavity in the fishing lure body.

Furthermore, a flap may be included in an underside of the fishing lure body adjacent to the hook connecting means to provide greater access to the body cavity whereby a user can create a "mousetrap" arrangement wherein a durable, flexible leader connects the hook to the hook connecting means. With this, when a fish is hooked the shank of the hook will be pulled from the hook shank retainer, and the mousetrap will be activated. The fish will then conduct its battle a leader's length away from the fishing lure body thereby further reducing damage to the lure and increasing the likelihood of catching the fish. The invention's effectiveness may be increased still further by having a bait scent pad coupled to the fishing lure such as by being inserted through the flap and retained within the fishing lure's body cavity. Finally, it may be advantageous to include at least one vent hole in the fishing lure body to allow air to escape therefrom to allow the fishing lure to sink to the ocean floor most easily and to act as a conduit for permitting bait scent to diffuse from the bait scent pad to the lure's surroundings.

The foregoing discussion broadly outlines the more important features of the invention to enable a better understanding of the detailed description that follows and to instill a better appreciation of the inventor's contribution to the art. Before an embodiment of the invention is explained in detail, however, it must be made clear that the following details, descriptions, and illustrations are merely exemplary of one or more possible manifestations of the invention; many other manifestations are possible and will become obvious to one skilled in the art upon reading this disclosure.

DETAILED DESCRIPTION OF A PREFERRED EMBODIMENT

Figure 1:
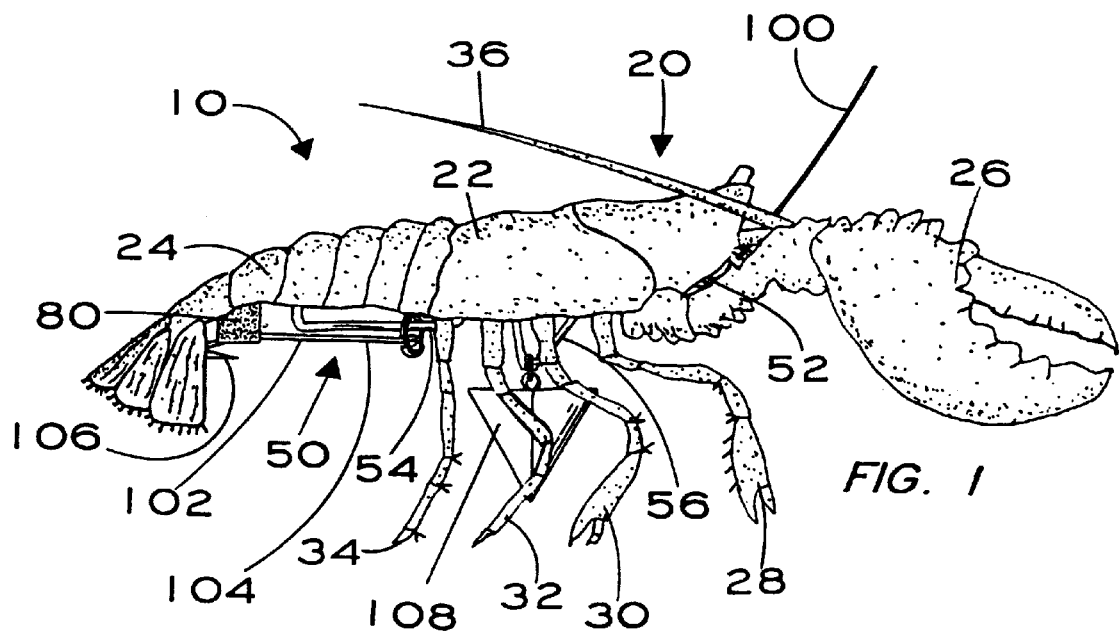
FIG. 1 is a view in side elevation of a simulative fishing lure embodying the present invention.
Figure 3:
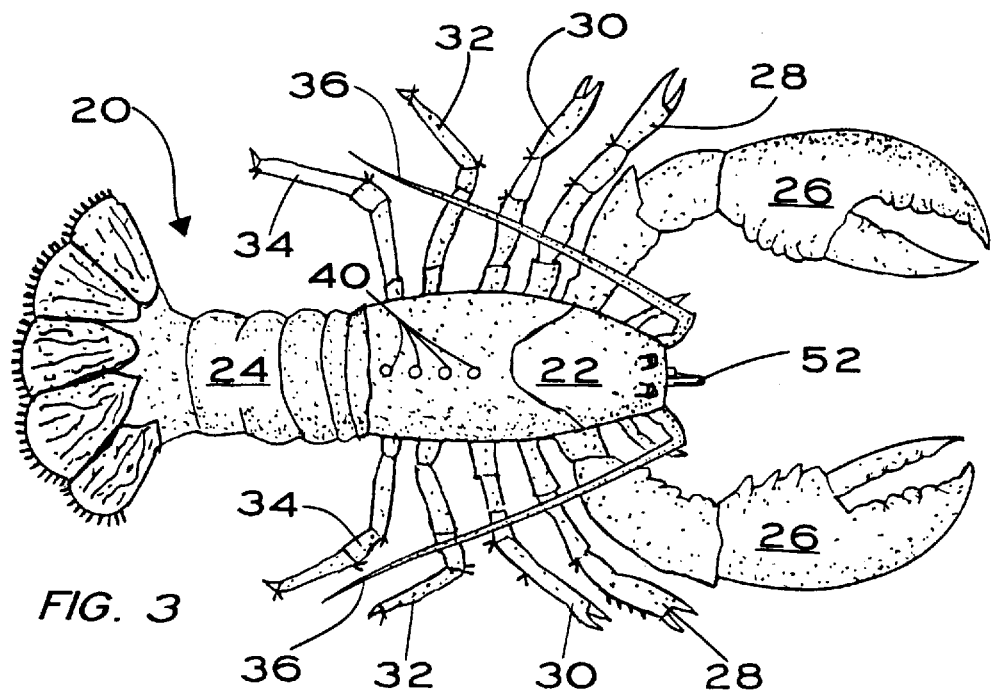
FIG. 3 is a top plan view of the fishing lure of FIG. 1.

Looking more particularly to the figures, FIG. 1 shows in side elevation a preferred embodiment of the fishing lure of the present invention indicated generally at 10. The fishing lure 10 has a body portion 20. In this embodiment, the simulative body portion 20 of the fishing lure 10 simulates an American lobster. As the top plan view of FIG. 3 shows most clearly, the simulative body portion 20 has an anterior cephalothorax portion 22 formed integrally with a posterior tail or abdomen portion 24. A first pair 26 of simulative lobster legs extend anteriorly of the cephalothorax portion 22 and simulate large claws or chela that are found on American lobsters, and a multiplicity of pairs 28, 30, 32, and 34 of lobster locomotion legs project from opposite sides of the cephalothorax portion 22 of the body portion 20 to simulate thinner American lobster locomotion legs. It is worth noting that, in the preferred embodiment, the multiplicity of pairs of lobster locomotion legs 28, 30, 32, and 34 project at a downward angle from the body portion 20 of the lure 10 with sufficient rigidity that they tend to support the body portion 20 above the sea floor as would the legs of a living lobster. In addition, should the lobster fishing lure 10 be moved along the sea floor by the fishing line or sea currents, the downward angle of the multiplicity of pairs of lobster legs 28, 30, 32, and 34 causes the fishing lure 10 to simulate the scampering movement of a live lobster thereby rendering the lure 10 still more attractive to hunting fish.

Figure 4:
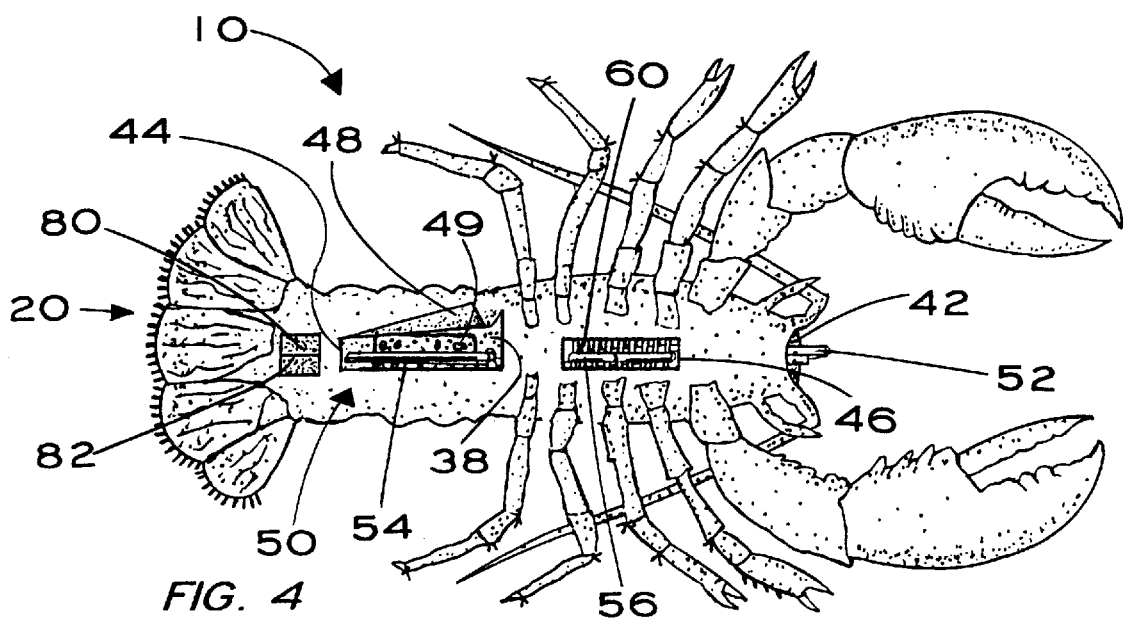
FIG. 4 is a bottom plan view of the fishing lure of FIG. 1.

A pair of antennae 36 extend from an anterior portion of the cephalothorax portion 22. As the bottom plan view of FIG. 4 shows most clearly, the body portion 20 has a body cavity 38 therein. To allow air to escape from the body cavity as the fishing lure 10 is lowered to a position on the sea floor, a multiplicity of vent holes 40 are included in the body portion 20. To enhance its lifelike appearance and movement, the entire body simulative body portion 20 in the preferred embodiment is formed from a resiliently deformable material such as rubber or the like.

Figure 5:
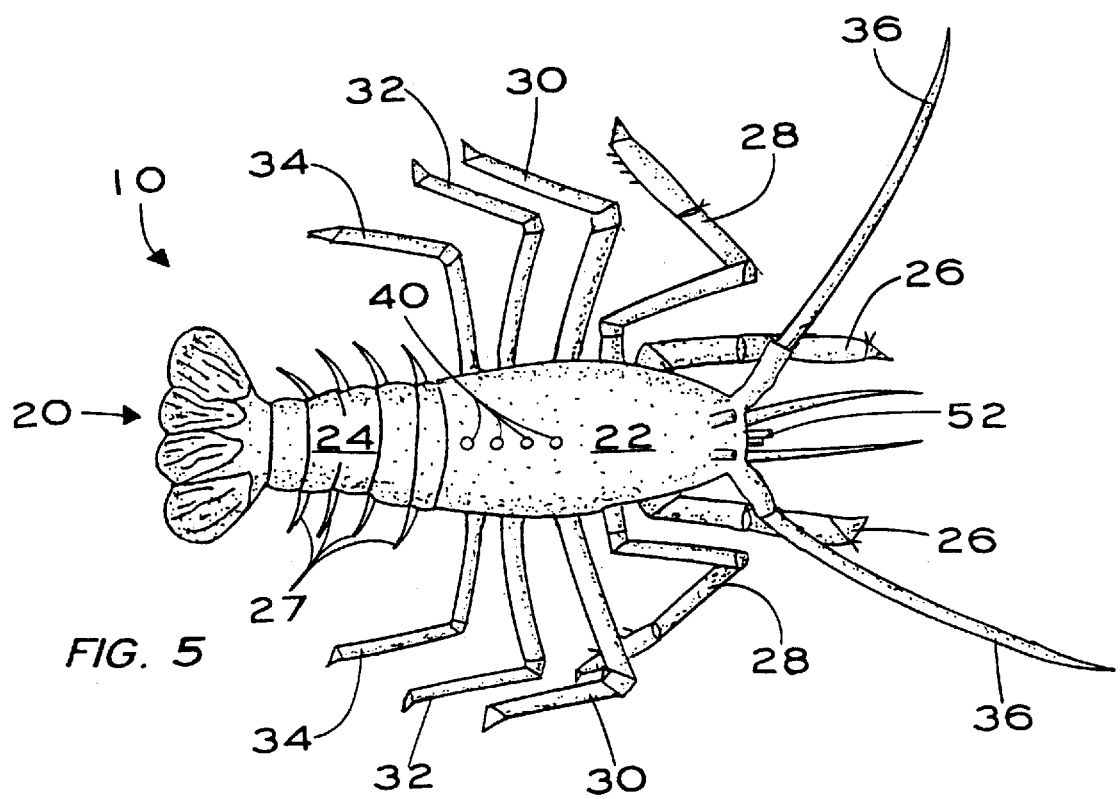
FIG. 5 is a top plan view of an alternative fishing lure embodying the present invention.

Of course, it is within the scope of the invention for the body portion 20 to assume many other forms including crustaceans other than lobsters, baitfish, and even non-simulative devices. By way of example, the body portion 20 of the fishing lure 10 alternatively could simulate a spiny lobster as is shown in FIG. 5. The spiny lobster body portion 20 exhibits many similarities to the American lobster body portion 20 except that its foremost pair of claws 26 are not the large chela found on American lobsters. Furthermore, a multiplicity of sharp spines 27 project from its abdomen 24.

As the figures depict, a fishing jig 50 is retained by the body cavity 38 of the resiliently deformable body portion 20, Advantageously, the resiliently deformable nature of the body portion 20 uniquely allows the fishing jig 50 to be manipulated into and out of the body cavity 38. As a result, a user may remove and replace one body portion 20 with another body portion 20 to suit environmental conditions, to attract a particular prey, or to replace a damaged body portion 20.

Figure 2:
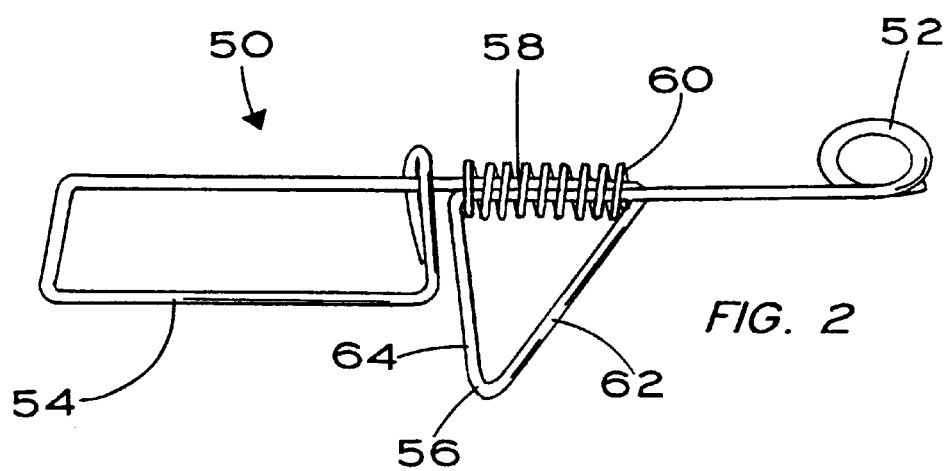
FIG. 2 is a view in side elevation of a fishing jig embodying the present invention.

In FIG. 2, the removable fishing jig 50 is shown apart from body cavity 38. In this preferred embodiment, the fishing jig 50 is formed from a single strand of generally rigid but ductile material. Research has shown that a one-sixteenth inch gauge steel rod is suitable stock. An eyelet 52 is bent into place at a first end of the fishing jig 50 as a means for attaching a fishing line 100 to the fishing jig 50 (and to the entire lure 10 when the fishing jig 50 has been manipulated to within the body cavity 38 of the body portion 20). As the bottom plan view of FIG. 4 shows, when the fishing jig 50 has been so manipulated, the eyelet 52 projects at least partially from within the body cavity 38 through a first access opening 42 in an anterior portion of the fishing lure body 20. A generally rectangular hook loop 54 is similarly bent into existence at a second end of the fishing jig 50 to form a means for attaching a fish hook 102 to the fishing jig 50. When the fishing jig 50 is retained within the body cavity 38, at least part of the loop 54 projects through a second access opening 44 in the fishing lure body 20. The fishing jig 50 is further bent to have a generally triangular ballast loop 56 with an overlapping portion 58 where the fishing jig 50 overlaps itself As a result, the ballast loop 56 sits in a middle portion of the fishing jig 50 to function as a means for attaching ballast 108 to the fishing jig 50. When the fishing jig is coupled to the body portion 20, the triangular ballast loop 56 at least partially projects through a third access opening 46 in the body portion 20. Of course, the fishing jig 50 may be welded or otherwise secured in selected areas or spots such as on the eyelet 52 and the hook loop 54

Mention of the ballast loop 56 prompts the discussion of a number of unique aspects of the present invention. For example, one may note that the fishing jig 50 is retained within the body cavity 38 generally along an imaginary centerline of the body portion 20, and one may further note that the ballast loop 56 is generally at the middle of the fishing jig 50. As a result, it becomes clear that the ballast loop 56 is located generally at a lateral and longitudinal center of the fishing jig 50. The inventor theorized and has proven that such location of the ballast 108 causes the fishing lure 10 to parachute through ocean water to assume an upright position on the sea floor. As a result, the fishing lure 10 reliably simulates a vulnerable lobster sitting generally still and unaware. Since such a lobster is a prized target of hunting fish, this reliable simulation has enabled the present fishing lure 10 to produce exceptional angling results.

Although desirable, the nature of the violent attacks that fish visit upon the present fishing lure 10 can lead to certain issues that must be addressed. Of course, the body portion 20 of the lure can suffer damage, but this problem is addressed by the invention's previously noted ability of enabling ready removal and replacement of damaged body portions 20. However, a fish's violent attack also could tend to damage the fishing jig 50 or the hook 102. It also might cause the barb 106 of the hook 102 to tear through a fish's mouth thereby producing the doubly undesirable result of injuring the fish while still not catching it. Advantageously, the inventor has conceived of including a means for absorbing a striking shock of an attacking fish. In the embodiment of FIG. 2, a spring 60 is interposed on the fishing jig 50 between the eyelet 52 and the hook loop 54 to act as a shock absorber. The spring 60 surrounds the overlapping portion 58 of the fishing jig 50 to bias opposing legs 62 and 64 of the triangular ballast loop 56 apart. Naturally, the shock absorber could assume a number of forms so long as it acts as some resiliently compressible mechanism to absorb the strike and fight of a fish.

Further aspects of the invention present themselves with mention of a hook shank retainer 80, which is shown in FIG. 4. The hook shank retainer 80 provides a means for retaining a shank 104 of the hook 102 substantially adjacent to the body portion 20 of the fishing lure 10. In this embodiment, the hook shank retainer 80 is comprised of a block or other volume of resiliently compressible material such as rubber. The hook shank retainer 80 has a deep slit 82 therein aligned with a centerline of the body portion 20 for receiving the shank 104 of the hook 102. Due to the resilient compressibility of the hook shank retainer 80, the shank 104 of the hook 102 is sandwiched in the slit 82 such that the barb 106 of the hook 102 may be oriented and retained in a selected orientation. For example, it has been found particularly effective for hooking fish and for reducing snagging to orient the hook 102 nearly against the body portion 20 as is shown in FIG. 4. Advantageously, a striking of a fish can pull the shank 104 of the hook 102 from the hook shank retainer 80 to minimize damage to the body portion 20 and to increase the likelihood that an attacking fish will be hooked. One might note that such a hook shank retainer 80 might tend to limit the size of hooks 102 that could be used with the fishing lure 10. However, by the invention's providing the rectangular hook loop 54, which may be characterized as longitudinally elongated due to its rectangular shape, hooks 102 with shanks 104 of many different sizes can be attached to the lure 10.

This most preferred embodiment further includes an access flap 48 immediately adjacent to the second access opening 44, and this access flap 48 begets discussion of two additional features of the fishing lure 10. The access flap 48 allows a user to insert and remove a bait scent pad 49 to and from the body cavity 38 of the body portion 20 whereby a user can treat the bait scent pad 49 with bait scent to increase the attractiveness of the lure 10 to fish still further. In FIG. 4, the bait scent pad 49 is shown wedged between the fishing jig 50 and the body portion 20. Advantageously, the vent holes 40 act as conduits for permitting bait scent to diffuse from the bait scent pad 49 to the environment of the lure 10. The access flap 48 also allows a user to create a "mousetrap" wherein a hook eyelet 105 is coupled, not directly to the hook loop 54 as is shown in FIG. 4, but indirectly through a leader (not shown). With such an arrangement, when a fish is hooked, the hook 102 is pulled from the hook shank retainer 80, the mousetrap is activated, and the fish continues its fight at a leader's length away from the fishing lure 10. As a result, damage to the fishing lure 10 is reduced further, and the likelihood of the fishing lure 10 interfering with a successful catch is minimized.

From the foregoing, it is apparent that the present invention provides those who take advantage of it with a number of advantages. For example, the invention's ability to simulate the appearance of a generally still lobster resting unaware on the ocean floor causes it to be a desirable target for hunting fish. Also, the invention is rendered particularly versatile and durable by its permitting removal and replacement of a simulative body portion 20 relative to a fishing jig 50. Furthermore, the location of the ballast 100 renders the fishing lure 10 still more useful because of the lure's 10 resultant tendency to assume an upright orientation on the sea floor. Further still, the ability of the hook shank retainer 80 to detachably retain a barb 106 of a hook 102 at a selected orientation increases the likelihood of hooking a fish and decreases the likelihood of snagging. Also, hooking a fish is made yet more likely by the invention's ability to absorb a striking shock of an attacking fish. Of equal importance are the economy and durability that are achieved by forming the fishing jig 50 of a single piece of stock which enables a high quality device to be manufactured and sold at a reasonable price. These and other advantages of the invention undoubtedly are obvious to one who has read this patent.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

I claim as protected by United States Letters Patent:

1. A simulative fishing lure for attracting and catching fish who prey on lobsters, the simulative fishing lure comprising:
    a simulative lobster body defined by an anterior cephalothorax portion and a posterior abdomen portion;
    a multiplicity of simulative lobster legs attached to and extending from opposite sides of the simulative lobster body;
    a means for coupling the simulative lobster body to a fishing jig; and
    a fishing jig coupled with the simulative lobster body;
    wherein the simulative lobster body is formed of a resiliently deformable material and further comprising a body cavity within the simulative lobster body wherein the fishing jig is removably and replacably retained within the body cavity whereby the fishing jig may be manipulated into and out of the body cavity in the simulative lobster body without damage to the simulative lobster body.

2. A simulative fishing lure for attracting and catching fish who prey on lobsters, the simulative fishing lure comprising:
    a simulative lobster body defined by an anterior cephalothorax portion and a posterior abdomen portion;
    a multiplicity of simulative lobster legs attached to and extending from opposite sides of the simulative lobster body;
    a means for coupling the simulative lobster body to a fishing jig;
    a fishing jig coupled with the simulative lobster body wherein the fishing jig comprises a fishing line attaching means fixed to an anterior portion of the jig for attaching the fishing lure to a fishing line, a ballast attaching means fixed to the jig for attaching ballast of differing weight to the fishing lure, and a hook attaching means fixed to a posterior portion of the jig for attaching a hook to the fishing lure wherein the hook attaching means comprises a longitudinally elongated loop; and
    a hook shank retainer coupled to the fishing lure posteriorly to the hook attaching means for retaining a shank of a hook substantially adjacent to the simulative lobster body whereby hooks of a multiplicity of different sizes may be attached to the fishing lure.

3. The simulative fishing lure of claim 2 wherein the hook shank retainer is comprised of a volume of resiliently compressible material with a slit therein aligned with a centerline of the simulative lobster body whereby a shank of a fishing hook may be sandwiched within the slit and held substantially adjacent to the simulative lobster body, the barb of the hook may be oriented and retained in a selected orientation, and a striking of a fish can pull the shank of the hook from the hook shank retainer to minimize damage to the simulative lobster body and to increase the likelihood that an attacking fish will be hooked.

4. A fishing lure for attracting and catching fish, the fishing lure comprising:
    a fishing lure body;
    a fishing jig coupled to the fishing lure body comprising
        a structure formed with a single member of generally rigid but ductile material,
        a fishing line attaching means attached to an anterior portion of the single member,
        a hook attaching means attached to a posterior portion of the single member, and
        a shock absorber means for absorbing a striking shock of an attacking fish wherein the shock absorber means comprises a resiliently compressible mechanism disposed about an overlapping portion of a doubled over loop formed in the single member between the hook attaching means and the line attaching means wherein the resiliently compressible mechanism compresses when a strike or fight of a fish pulls the hook attaching means away from the fishing line attaching means.

5. A fishing lure for attracting and catching fish, the fishing lure comprising:
    a fishing lure body;
    a fishing jig coupled to the fishing lure body wherein the fishing jig comprises a structure formed from a single member of generally rigid but ductile material wherein a first end of the single member is bent back upon itself to comprise a fishing line attaching means in the form of an eyelet wherein a second end of the single member is bent back upon itself to comprise a fishing hook attaching means in the form of a loop; and wherein a middle portion of the single member is doubled over upon itself to comprise a ballast attaching means in the form of a loop with an overlapping portion; and
    a resiliently-compressible mechanism surrounding the overlapping portion of the ballast attaching means for absorbing a striking shock of an attacking fish wherein the resiliently compressible mechanism compresses upon receiving a striking shock of an attacking fish.

6. A fishing lure for attracting and catching fish, the fishing lure comprising:
    a fishing lure body wherein the fishing lure body is formed of a resiliently deformable material;
    a fishing jig removably and replacably coupled to the fishing lure body;
    a fishing line attaching means attached to the fishing jig;
    a hook attaching means attached to the fishing jig; and
    a body cavity within the fishing lure body wherein the fishing jig is removably and replacably retained within the body cavity and is substantially enclosed by the body cavity whereby the fishing jig may be manipulated into and out of the body cavity in the fishing lure body without damage to the fishing lure body.

7. The fishing lure of claim 6 wherein the fishing line attaching means is attached to an anterior portion of the fishing jig, wherein the hook attaching means is attached to a posterior portion the spine of a fishing jig, and wherein the fishing lure body has at least one access opening for permitting access to the fishing line attaching means and the hook attaching means.

8. The fishing lure of claim 7 wherein there is a first access opening in an anterior portion of the fishing lure body wherein the first access opening permits access to the fishing line attaching means and a second access opening wherein the second access opening permits access to the fish hook attaching means.

9. The fishing lure of claim 8 further comprising a ballast attaching means attached to the fishing jig whereby ballast of differing weight may be selectively attached to the fishing lure and further comprising a third access opening in a middle portion of the fishing lure body for permitting access to the ballast attaching means.

10. The fishing lure of claim 6 further comprising at least one vent hole in the fishing lure body for permitting air to escape from the body cavity to allow the fishing lure to sink to the ocean floor most easily.

11. The fishing lure of claim 6 further comprising a flap in an underside of the fishing lure body adjacent to the hook connecting means for providing greater access to the body cavity.

12. The fishing lure of claim 6 further comprising a bait scent pad contained within the body cavity.

13. A fishing lure for attracting and catching fish, the fishing lure comprising:

a fishing lure body;

a fishing jig coupled to the fishing lure body;

a fishing line attaching means attached to the fishing jig;

a hook attaching means attached to the fishing jig wherein the hook attaching means comprises a longitudinally elongated loop of rigid material; and a hook shank retainer coupled to the fishing lure posteriorly to the hook attaching means whereby hooks of a multiplicity of different sizes may be attached to the fishing lure and a shank of a hook may be retained substantially adjacent to the fishing lure body.

14. The fishing lure of claim 13 wherein the hook shank retainer is comprised of a volume of resiliently compressible material with a slit therein aligned with a centerline of the fishing lure body whereby a shank of a fishing hook may be sandwiched within the slit and held substantially adjacent to the fishing lure body, the barb of the hook may be oriented and retained in a selected orientation, and a striking of a fish can pull the shank of the hook from the hook shank retainer thereby minimizing damage to the fishing lure body and increasing the likelihood that an attacking fish will be hooked.

* * * * *